(12) United States Patent
Torrent et al.

(10) Patent No.: US 12,268,283 B2
(45) Date of Patent: Apr. 8, 2025

(54) MALE TOUCH FASTENER ELEMENTS

(71) Applicant: Velcro IP Holdings LLC, Manchester, NH (US)

(72) Inventors: Antoli Fauria Torrent, Mataro (ES); Luis Parellada Armela, Palafrugell (ES); Emili Pubill Piera, Mataro (ES); James L. Tardiff, Manchester, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 0 days.

(21) Appl. No.: 18/423,456

(22) Filed: Jan. 26, 2024

(65) Prior Publication Data

US 2024/0407508 A1 Dec. 12, 2024

Related U.S. Application Data

(63) Continuation of application No. 18/541,824, filed on Dec. 15, 2023, now Pat. No. 12,082,661, which is a
(Continued)

(51) Int. Cl.
  *A44B 18/00* (2006.01)
  *B29C 41/02* (2006.01)
  *B29C 59/02* (2006.01)

(52) U.S. Cl.
  CPC ...... *A44B 18/0065* (2013.01); *A44B 18/0049* (2013.01); *B29C 41/02* (2013.01); *B29C 59/025* (2013.01)

(58) Field of Classification Search
  CPC . A44B 18/0049; A44B 18/0065; B29C 41/02; B29C 59/025
  See application file for complete search history.

(56) References Cited

U.S. PATENT DOCUMENTS

| | | | |
|---|---|---|---|
| 4,454,183 A | 6/1984 | Wollman | |
| 6,248,276 B1 * | 6/2001 | Parellada | A44B 18/0049 264/296 |

(Continued)

FOREIGN PATENT DOCUMENTS

| | | | | |
|---|---|---|---|---|
| WO | WO-0242052 A1 * | 5/2002 | ......... | A44B 18/0049 |
| WO | WO 2009149909 | 12/2009 | | |
| WO | WO-2009149909 A2 * | 12/2009 | ......... | A44B 18/0049 |

OTHER PUBLICATIONS

Machine translation WO2009149909A2 (Year: 2009).*
(Continued)

*Primary Examiner* — Jacob T Minskey
*Assistant Examiner* — Wayne K. Swier
(74) *Attorney, Agent, or Firm* — Fish & Richardson P.C.

(57) ABSTRACT

A male touch fastener product has an array of discrete fastening elements extending from a resin base. The elements are formed by molding stems and then deforming at least a rim of a distal end of each head to form an overhanging mushroom-type fastener element. Some are deformed against a hard surface to form flat fastener elements, and others are deformed against a compliant surface and form umbrella-shaped fastener elements. The fastener element heads feature particular structural relationships that enhance their performance, particularly with low-lying fibers.

17 Claims, 12 Drawing Sheets

Related U.S. Application Data continuation of application No. 18/383,499, filed on Oct. 25, 2023, now Pat. No. 12,022,917, which is a continuation of application No. 18/195,451, filed on May 10, 2023, now Pat. No. 11,889,903.

(60) Provisional application No. 63/453,226, filed on Mar. 20, 2023.

(56) References Cited

U.S. PATENT DOCUMENTS

| | | | |
|---|---|---|---|
| 6,592,800 B1* | 7/2003 | Levitt | B29C 67/0044 264/479 |
| 6,678,924 B2 | 1/2004 | Murasaki et al. | |
| 6,869,554 B2* | 3/2005 | Provost | B29C 43/222 264/319 |
| 6,991,843 B2 | 1/2006 | Armela et al. | |
| 8,819,902 B2 | 9/2014 | Tuma | |
| 10,894,345 B2* | 1/2021 | Hodsdon | B29C 43/58 |
| 11,089,845 B2 | 8/2021 | Fukuhara et al. | |
| 11,246,380 B2 | 2/2022 | Parellada Armela et al. | |
| 11,889,903 B1 | 2/2024 | Torrent et al. | |
| 2003/0106188 A1* | 6/2003 | Armela | A44B 18/0065 24/451 |
| 2003/0131453 A1 | 7/2003 | Clarner et al. | |
| 2007/0035060 A1* | 2/2007 | Harvey | A44B 18/0061 264/167 |
| 2007/0063375 A1 | 3/2007 | Tuma | |
| 2008/0264275 A1* | 10/2008 | Wilhelm | B31F 1/07 100/210 |
| 2011/0008570 A1* | 1/2011 | Seth | A61F 13/0273 428/100 |
| 2012/0267033 A1 | 10/2012 | Mueller | |
| 2013/0067702 A1 | 3/2013 | Tuma | |
| 2013/0125353 A1 | 5/2013 | Tuma | |
| 2014/0103567 A1 | 4/2014 | Collins et al. | |
| 2014/0237779 A1* | 8/2014 | Gallant | B29C 43/50 24/449 |
| 2015/0074956 A1 | 3/2015 | Marche et al. | |
| 2015/0275941 A1 | 10/2015 | Nisogi | |
| 2017/0020236 A1 | 1/2017 | Rocha et al. | |
| 2019/0016023 A1* | 1/2019 | Parellada Armela | B29C 43/46 |
| 2019/0053582 A1 | 2/2019 | Gallant et al. | |
| 2020/0170356 A1 | 6/2020 | Parellada Armela et al. | |

OTHER PUBLICATIONS

Merriam Webster Definition of Polygon https://www.merriam-webster.com/dictionary/polygon (Year: 2009).*

Machine translation WO0242052A1 (Year: 2002).*

* cited by examiner

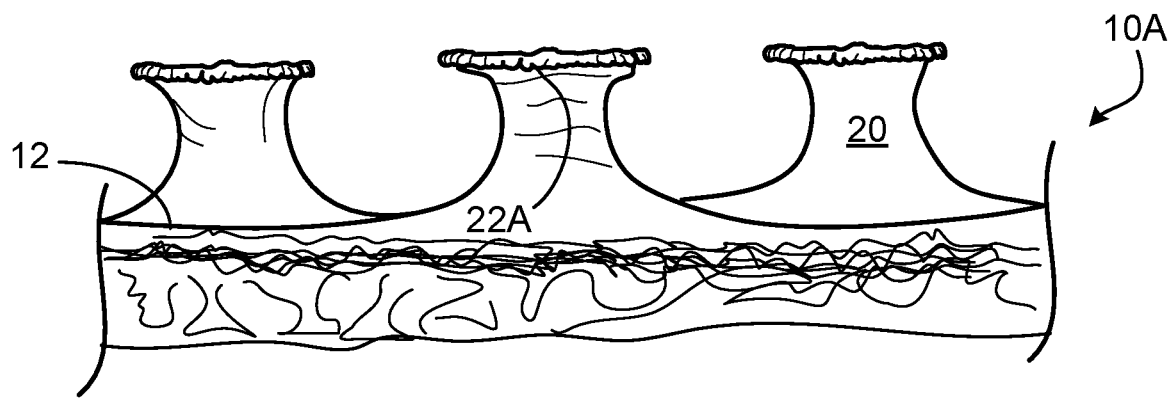
FIG. 3 → MD
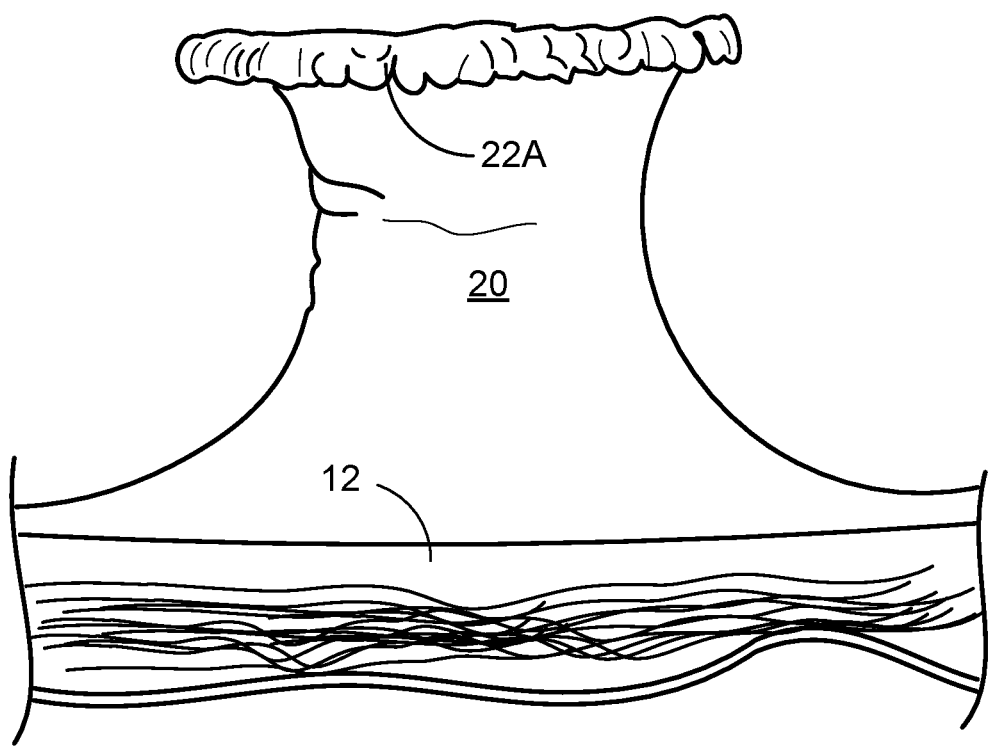
FIG. 5A

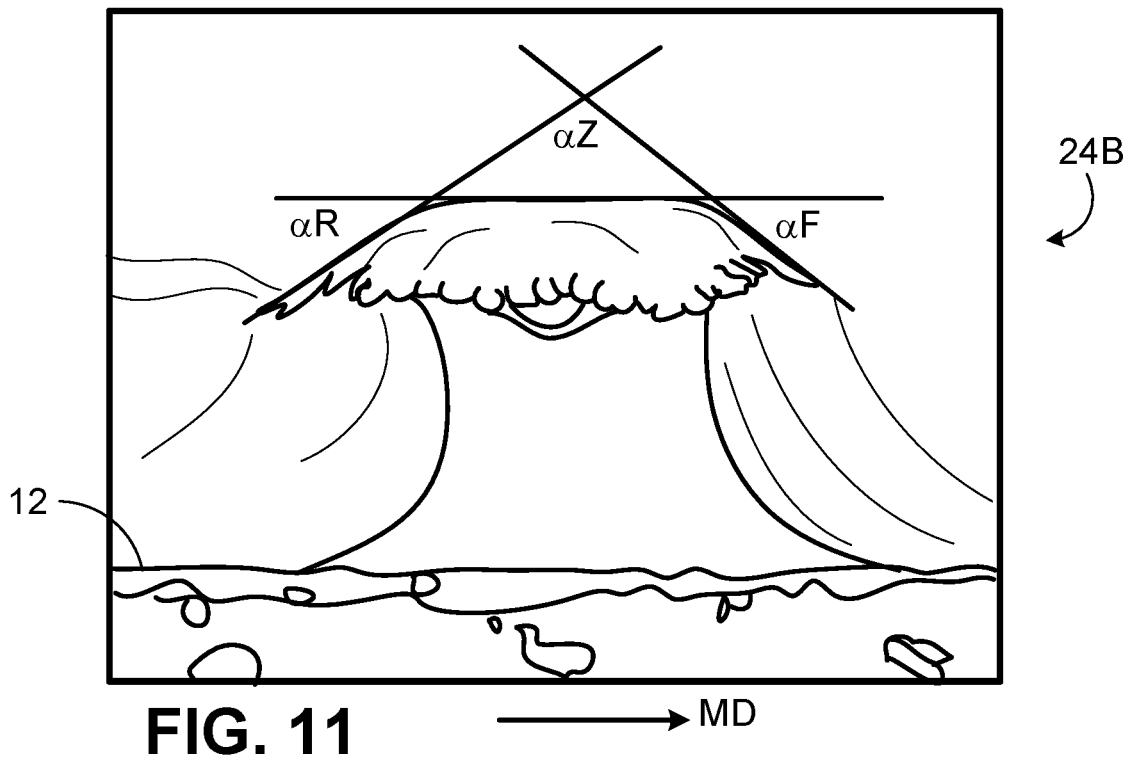
FIG. 11  → MD
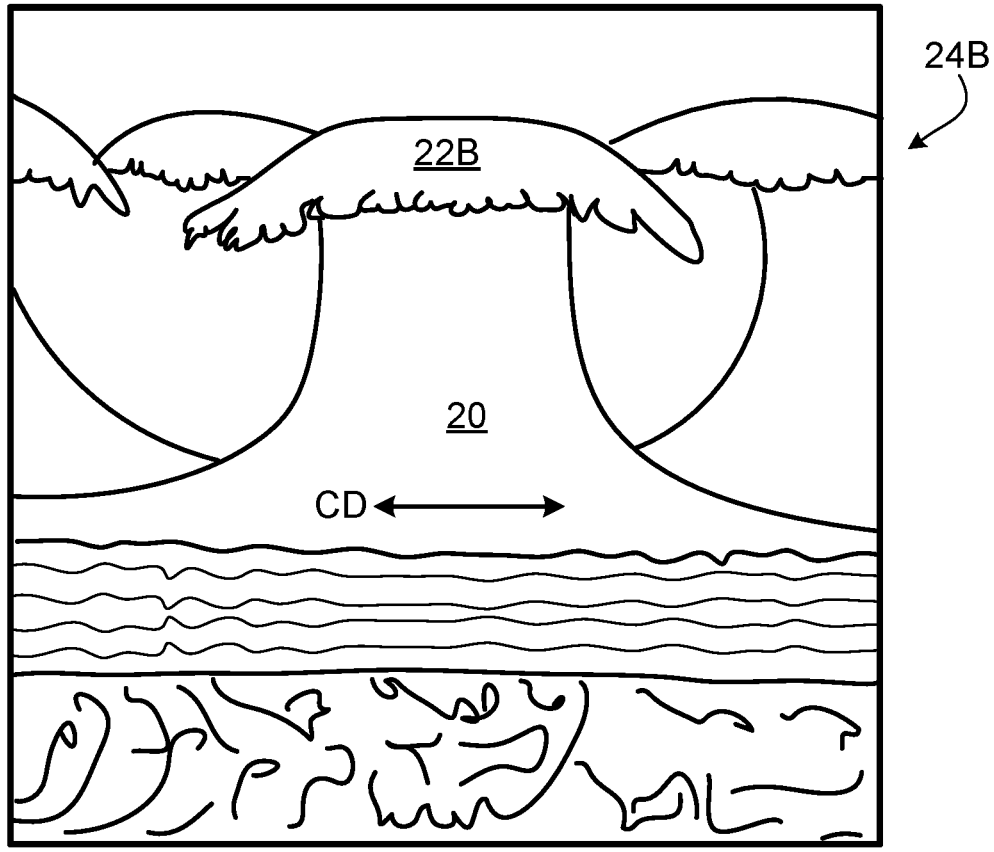
FIG. 12

MALE TOUCH FASTENER ELEMENTS

CROSS REFERENCE TO RELATED APPLICATION

This application is a continuation of U.S. Ser. No. 18/541,824, filed Dec. 15, 2023, which is a continuation of U.S. Ser. No. 18/383,499, filed Oct. 25, 2023, which is a continuation of U.S. Ser. No. 18/195,451, filed May 10, 2023, which claims priority to U.S. Provisional Application No. 63/453,226, filed Mar. 20, 2023, and each is hereby incorporated by reference in its entirety for all purposes.

TECHNICAL FIELD

This invention relates to touch fastener elements, and more particularly to molded touch fastener elements of the mushroom type.

BACKGROUND

Touch fasteners are useful for releasable engagement of surfaces in products ranging from diapers to construction materials. In most cases, the engagement is between an array of very small male fastener elements and a field of fibers or loops, but in some cases heads of the male fastener elements can be shaped and spaced so as to releasably engage a similar array. Some male fastener elements have heads that overhang along only one lateral direction, while others overhang in multiple directions (or in all directions). The former (often referred to as J-shaped or palm tree fasteners) tend to have very directional engagement characteristics, whereas the latter (often referred to as mushroom-shaped fasteners) have engagement characteristics in all directions. Each type of male fastener element has its preferred uses in commercial products. Mushroom-shaped fastener elements can be made with fairly thin heads, for engagement with very low loft fibers as tend to be found in inexpensive non-woven materials. Improvements in fastener element shape, and in methods of making such shapes, are continually sought.

SUMMARY

A first aspect of the invention features a male touch fastener product having a resin surface and an array of at least 30 spaced-apart male touch fastener elements arranged in rows and columns and carried on the surface. Each touch fastener element extends above the resin surface and includes an elongated stem extending from the surface and defining, at a midpoint of an overall length of the stem, a stem cross-sectional area perpendicular to the stem and bounded by an outer perimeter of the stem, and a head disposed at a distal end of the stem and forming with the stem and the surface a contiguous mass of resin. The head extends laterally from the stem to a distal edge overhanging the surface and defines an overall projected head area in a plane parallel to the resin surface. Each fastener element defines an overhang footprint as a difference between the overall projected head area and the stem cross-sectional area, and the array defines an overhang ratio, as a ratio of the total overhang footprint of all fastener elements in the array to a smallest area of the product including the array, of between 7 and 17 percent (in some examples, between about 10 and 16 percent).

In some embodiments, the fastener element head is generally flat across a region disposed directly over the stem. In some cases, the fastener element head is generally flat to its distal edge.

In some embodiments, the stems are of polygonal cross-section, such as of hexagonal cross-section. In some examples, the overall projected head area has a generally hexagonal perimeter.

In some cases, the head overhangs the resin surface farthest on one side of the stem. In cases where the stems are of polygonal cross-section, an apex of the cross-section may be aligned with the one side of the stem at which the head overhangs farthest.

In some embodiments, the product is in strip form, with a length greater than its overall width, and the columns extending along its length.

In some examples, the fastener element head has a central region that is generally flat and perpendicular to the stem and disposed directly above the stem, and an edge region surrounding the central region, in which edge region the upper surface angles downward toward the resin surface, with the edge region terminating at the distal edge of the head.

In some cases, the distal edge defines a minimum edge height above the surface, the head defines a head return equal to a difference between the overall height of the fastener element above the resin surface and the minimum edge height above the surface, and for each of at least most of the fastener elements of the array, the fastener element has an umbrella ratio, defined as a ratio of the head return to the overall height of the fastener element above the resin surface, of between about 0.2 and 0.5.

In some examples the edge region of the upper surface of the head defines a declination angle with respect to the resin surface, and for each of at least most of the fastener elements of the array, the declination angle of the edge region of the upper surface of the head at one side of the head is greater than at an opposite side of the head.

In some embodiments, the distal edge of the head has multiple toes extending laterally outward and varying in shape and size about the edge, with adjacent toes having facing, free-form resin surfaces defining crevices therebetween, the crevices being narrower than the adjacent toes.

In some examples the head defines an overall lateral extent at the distal edge, and for each of at least most adjacent pairs of fastener elements of the array, the two heads of the fastener elements of the pair are separated by a lateral distance of between 0.9 and 4.0 times an average of the overall lateral extent of the two heads along a line including the lateral distance.

In some cases, the fastener element has an average overhang defined as a difference between the overall lateral extent of the head and an average lateral extent of the stem, and for each of at least most adjacent pairs of fastener elements of the array, the two heads of the fastener elements of the pair are separated by a lateral distance of between 2.0 and 7.0 times an average of the overhang of the fastener elements of the pair.

A second aspect of the invention features a male touch fastener product with a resin surface and an array of spaced-apart male touch fastener elements carried on the surface. Each touch fastener element extends above the resin surface and includes an elongated stem extending from the surface and a head disposed at a distal end of the stem and forming with the stem and the surface a contiguous mass of resin. The head extends laterally from the stem to a distal edge overhanging the surface and defines an overall lateral extent at the distal edge. For each of at least most adjacent pairs of fastener elements of the array, the two heads of the fastener elements of the pair are separated by a lateral distance of between 0.9 and 4.0 times (in some cases, between 1.0 and 2.0 times) an average of the overall lateral extent of the two heads along a line including the lateral distance.

In some embodiments, the array of spaced-apart male touch fastener elements has multiple rows and multiple columns of fastener elements, and each fastener element of the adjacent pair is of a different row and column. In some cases the product is in strip form, with a length greater than its overall width, and the columns extending along its length.

In some embodiments, the fastener element head is generally flat across a region disposed directly over the stem. In some cases, the fastener element head is generally flat to its distal edge.

In some embodiments, the stems are of polygonal cross-section, such as of hexagonal cross-section. In some examples, the overall projected head area has a generally hexagonal perimeter.

In some cases, the head overhangs the resin surface farthest on one side of the stem. In cases where the stems are of polygonal cross-section, an apex of the cross-section may be aligned with the one side of the stem at which the head overhangs farthest.

In some embodiments, the product is in strip form, with a length greater than its overall width, and the columns extending along its length.

In some examples, the fastener element head has a central region that is generally flat and perpendicular to the stem and disposed directly above the stem, and an edge region surrounding the central region, in which edge region the upper surface angles downward toward the resin surface, with the edge region terminating at the distal edge of the head.

In some cases, the distal edge defines a minimum edge height above the surface, the head defines a head return equal to a difference between the overall height of the fastener element above the resin surface and the minimum edge height above the surface, and for each of at least most of the fastener elements of the array, the fastener element has an umbrella ratio, defined as a ratio of the head return to the overall height of the fastener element above the resin surface, of between about 0.2 and 0.5.

In some examples the edge region of the upper surface of the head defines a declination angle with respect to the resin surface, and for each of at least most of the fastener elements of the array, the declination angle of the edge region of the upper surface of the head at one side of the head is greater than at an opposite side of the head.

In some embodiments, the distal edge of the head has multiple toes extending laterally outward and varying in shape and size about the edge, with adjacent toes having facing, free-form resin surfaces defining crevices therebetween, the crevices being narrower than the adjacent toes.

In some examples the head defines an overall lateral extent at the distal edge, and for each of at least most adjacent pairs of fastener elements of the array, the two heads of the fastener elements of the pair are separated by a lateral distance of between 0.9 and 4.0 times an average of the overall lateral extent of the two heads along a line including the lateral distance.

In some cases, the fastener element has an average overhang defined as a difference between the overall lateral extent of the head and an average lateral extent of the stem, and for each of at least most adjacent pairs of fastener elements of the array, the two heads of the fastener elements of the pair are separated by a lateral distance of between 2.0 and 7.0 times an average of the overhang of the fastener elements of the pair.

A third aspect of the invention features a male touch fastener product with a resin surface and an array of spaced-apart male touch fastener elements carried on the surface. Each touch fastener element extends above the resin surface and includes an elongated stem extending from the surface and defining, at a midpoint of an overall length of the stem, an average lateral extent in a plane perpendicular to the stem, and a head disposed at a distal end of the stem and forming with the stem and the surface a contiguous mass of resin. The head extends laterally from the stem to a distal edge overhanging the surface and defines an overall lateral extent at the distal edge. The fastener element has an average overhang defined as a difference between the overall lateral extent of the head and the average lateral extent of the stem. For each of at least most adjacent pairs of fastener elements of the array, the two heads of the fastener elements of the pair are separated by a lateral distance of between 2.0 and 7.0 times (in some cases, between 2.0 and 4.0 times) an average of the overhang of the fastener elements of the pair.

In some embodiments, the array of spaced-apart male touch fastener elements has multiple rows and multiple columns of fastener elements, and each fastener element of the adjacent pair is of a different row and column. In some cases the product is in strip form, with a length greater than its overall width, and the columns extending along its length.

In some embodiments, the fastener element head is generally flat across a region disposed directly over the stem. In some cases, the fastener element head is generally flat to its distal edge.

In some embodiments, the stems are of polygonal cross-section, such as of hexagonal cross-section. In some examples, the overall projected head area has a generally hexagonal perimeter.

In some cases, the head overhangs the resin surface farthest on one side of the stem. In cases where the stems are of polygonal cross-section, an apex of the cross-section may be aligned with the one side of the stem at which the head overhangs farthest.

In some examples, the fastener element head has a central region that is generally flat and perpendicular to the stem and disposed directly above the stem, and an edge region surrounding the central region, in which edge region the upper surface angles downward toward the resin surface, with the edge region terminating at the distal edge of the head.

In some cases, the distal edge defines a minimum edge height above the surface, the head defines a head return equal to a difference between the overall height of the fastener element above the resin surface and the minimum edge height above the surface, and for each of at least most of the fastener elements of the array, the fastener element has an umbrella ratio, defined as a ratio of the head return to the overall height of the fastener element above the resin surface, of between about 0.2 and 0.5.

In some examples the edge region of the upper surface of the head defines a declination angle with respect to the resin surface, and for each of at least most of the fastener elements of the array, the declination angle of the edge region of the upper surface of the head at one side of the head is greater than at an opposite side of the head.

In some embodiments, the distal edge of the head has multiple toes extending laterally outward and varying in shape and size about the edge, with adjacent toes having facing, free-form resin surfaces defining crevices therebetween, the crevices being narrower than the adjacent toes.

In some examples the head defines an overall lateral extent at the distal edge, and for each of at least most adjacent pairs of fastener elements of the array, the two heads of the fastener elements of the pair are separated by a lateral distance of between 0.9 and 4.0 times an average of the overall lateral extent of the two heads along a line including the lateral distance.

A fourth aspect of the invention features a male touch fastener product with a resin surface and an array of spaced-apart male touch fastener elements carried on the surface. Each touch fastener element extends to an overall height above the resin surface and includes a stem extending from the surface and a head disposed at a distal end of the stem and forming with the stem and the surface a contiguous mass of resin. The head extends laterally from the stem to a distal edge overhanging the surface about the stem, the distal edge extending toward the surface and defining a minimum edge height above the surface. The head defines a head return equal to a difference between the overall height of the fastener element above the resin surface and the minimum edge height above the surface. For each of at least most of the fastener elements of the array, the fastener element has an umbrella ratio, defined as a ratio of the head return to the overall height of the fastener element above the resin surface, of between about 0.2 and 0.5.

In some embodiments, the array of spaced-apart male touch fastener elements has multiple rows and multiple columns of fastener elements, and each fastener element of the adjacent pair is of a different row and column. In some cases the product is in strip form, with a length greater than its overall width, and the columns extending along its length.

In some embodiments, the fastener element head is generally flat across a region disposed directly over the stem. In some cases, the fastener element head is generally flat to its distal edge.

In some embodiments, the stems are of polygonal cross-section, such as of hexagonal cross-section. In some examples, the overall projected head area has a generally hexagonal perimeter.

In some cases, the head overhangs the resin surface farthest on one side of the stem. In cases where the stems are of polygonal cross-section, an apex of the cross-section may be aligned with the one side of the stem at which the head overhangs farthest.

In some examples, the fastener element head has a central region that is generally flat and perpendicular to the stem and disposed directly above the stem, and an edge region surrounding the central region, in which edge region the upper surface angles downward toward the resin surface, with the edge region terminating at the distal edge of the head.

In some examples the edge region of the upper surface of the head defines a declination angle with respect to the resin surface, and for each of at least most of the fastener elements of the array, the declination angle of the edge region of the upper surface of the head at one side of the head is greater than at an opposite side of the head.

In some embodiments, the distal edge of the head has multiple toes extending laterally outward and varying in shape and size about the edge, with adjacent toes having facing, free-form resin surfaces defining crevices therebetween, the crevices being narrower than the adjacent toes.

In some examples the head defines an overall lateral extent at the distal edge, and for each of at least most adjacent pairs of fastener elements of the array, the two heads of the fastener elements of the pair are separated by a lateral distance of between 0.9 and 4.0 times an average of the overall lateral extent of the two heads along a line including the lateral distance.

A fifth aspect of the invention features a male touch fastener product with an elongated resin surface defining a machine direction along its length and an array of spaced-apart male touch fastener elements carried on the surface. Each touch fastener element extends to an overall height above the resin surface and includes a stem extending from the surface and a head disposed at a distal end of the stem and forming with the stem and the surface a contiguous mass of resin. The head has an upper surface with a central region that is generally flat and perpendicular to the stem and disposed directly above the stem, and an edge region surrounding the central region, in which edge region the upper surface angles downward toward the resin surface, with the edge region terminating at a distal edge of the head. The edge region of the upper surface of the head defines a declination angle with respect to the resin surface, and for each of at least most of the fastener elements of the array, the declination angle of the edge region of the upper surface of the head at one side of the head is greater than at an opposite side of the head.

In some embodiments, the declination angle of the edge region of the upper surface of the head at the one side of the head is greater than at the opposite side of the head by about 5 to 20 degrees.

In some embodiments, the fastener element head is generally flat across a region disposed directly over the stem. In some cases, the fastener element head is generally flat to its distal edge.

In some embodiments, the stems are of polygonal cross-section, such as of hexagonal cross-section. In some examples, the overall projected head area has a generally hexagonal perimeter.

In some cases, the head overhangs the resin surface farthest on one side of the stem. In cases where the stems are of polygonal cross-section, an apex of the cross-section may be aligned with the one side of the stem at which the head overhangs farthest.

In some embodiments, the array of spaced-apart male touch fastener elements has multiple rows and multiple columns of fastener elements, and each fastener element of the adjacent pair is of a different row and column. In some cases the product is in strip form, with a length greater than its overall width, and the columns extending along its length.

In some embodiments, the distal edge of the head has multiple toes extending laterally outward and varying in shape and size about the edge, with adjacent toes having facing, free-form resin surfaces defining crevices therebetween, the crevices being narrower than the adjacent toes.

In some examples the head defines an overall lateral extent at the distal edge, and for each of at least most adjacent pairs of fastener elements of the array, the two heads of the fastener elements of the pair are separated by a lateral distance of between 0.9 and 4.0 times an average of the overall lateral extent of the two heads along a line including the lateral distance.

In some embodiments the head defines a head included angle, equal to 180 degrees minus a sum of the declination angles at the one side of the head and the opposite side of the head, of between 65 and 110 degrees.

In some examples, the one side of the head of each of the fastener elements of the array all face in a common direction.

In some cases, the stem of the fastener element is canted toward the opposite side of the head.

A sixth aspect of the invention features a male touch fastener product with an elongated resin surface defining a machine direction along its length, and an array of spaced-apart male touch fastener elements carried on the surface. Each touch fastener element extends to an overall height above the resin surface and includes a stem extending from the surface, and a head disposed at a distal end of the stem and forming with the stem and the surface a contiguous mass of resin. The head has an upper surface with a central region that is generally flat and perpendicular to the stem and disposed directly above the stem, an upper edge region surrounding the central region, in which upper edge region the upper surface is circumferentially smooth and continuous and angles downward toward the resin surface, and a lower edge region surrounding and contiguous with the upper edge region and terminating in a distal edge. The height of the distal edge above the resin surface oscillates around the head between local minima and local maxima, such that segments of the lower edge region defined between adjacent local minima form curved petals extending toward the resin surface. For each of at least most of the fastener elements of the array, a difference between a smallest of the local minima and a greatest of the local maxima is between about 20 and 45 percent of a difference between the overall height and the smallest of the local minima.

In some embodiments, the fastener element head is generally flat across a region disposed directly over the stem. In some cases, the fastener element head is generally flat to its distal edge.

In some embodiments, the stems are of polygonal cross-section, such as of hexagonal cross-section. In some examples, the overall projected head area has a generally hexagonal perimeter.

In some cases, the head overhangs the resin surface farthest on one side of the stem. In cases where the stems are of polygonal cross-section, an apex of the cross-section may be aligned with the one side of the stem at which the head overhangs farthest.

In some embodiments, the array of spaced-apart male touch fastener elements has multiple rows and multiple columns of fastener elements, and each fastener element of the adjacent pair is of a different row and column. In some cases the product is in strip form, with a length greater than its overall width, and the columns extending along its length.

In some embodiments, the distal edge of the head has multiple toes extending laterally outward and varying in shape and size about the edge, with adjacent toes having facing, free-form resin surfaces defining crevices therebetween, the crevices being narrower than the adjacent toes.

In some examples the head defines an overall lateral extent at the distal edge, and for each of at least most adjacent pairs of fastener elements of the array, the two heads of the fastener elements of the pair are separated by a lateral distance of between 0.9 and 4.0 times an average of the overall lateral extent of the two heads along a line including the lateral distance.

Other aspects of the invention feature methods of making the touch fastener products described above. Various embodiments of these inventive methods result in product features noted above.

For example, a seventh aspect of the invention features a method of making a male touch fastener product, the method including molding a resin surface while forming an array of at least 30 spaced-apart male touch fastener elements extending from the surface in rows and columns. Each touch fastener element has an elongated stem extending from the surface and defining, at a midpoint of an overall length of the stem, a stem cross-sectional area perpendicular to the stem and bounded by an outer perimeter of the stem, and a head disposed at a distal end of the stem and forming with the stem and the surface a contiguous mass of resin. The head extends laterally from the stem to a distal edge overhanging the surface, the head defines an overall projected head area in a plane parallel to the resin surface, and the fastener element defines an overhang footprint as a difference between the overall projected head area and the stem cross-sectional area. The touch fastener product is made by pressing moldable resin into respective molding cavities defined in a mold against which mold the resin surface is molded, solidifying the pressed resin in the molding cavities, and then stripping the solidified resin from the cavities as stems with associated heads disposed at distal ends of the stems and overhanging the surface, followed by deforming the heads by pressing against them with a heading surface. The deforming causes the array to define an overhang ratio, as a ratio of the total overhang footprint of all fastener elements in the array to a smallest area of the product including the array, of between 7 and 17 percent.

An eighth aspect of the invention features a method of making a male touch fastener product, the method including molding a resin surface while forming an array of spaced-apart male touch fastener elements extending from the surface. Each touch fastener element includes an elongated stem extending from the surface, and a head disposed at a distal end of the stem and forming with the stem and the surface a contiguous mass of resin. The head extends laterally from the stem to a distal edge overhanging the surface and defines an overall lateral extent at the distal edge. The touch fastener product is made by pressing moldable resin into respective molding cavities defined in a mold against which mold the resin surface is molded, solidifying the pressed resin in the molding cavities, and then stripping the solidified resin from the cavities as stems with associated heads disposed at distal ends of the stems and overhanging the surface, followed by deforming the heads by pressing against them with a heading surface. The deforming causes, for each of at least most adjacent pairs of fastener elements of the array, the two heads of the fastener elements of the pair to be separated by a lateral distance of between 0.9 and 4.0 times an average of the overall lateral extent of the two heads along a line including the lateral distance.

A ninth aspect of the invention features a method of making a male touch fastener product, the method including molding a resin surface while forming an array of spaced-apart male touch fastener elements extending from the surface. Each touch fastener element includes an elongated stem extending from the surface and defining, at a midpoint of an overall length of the stem, an average lateral extent in a plane perpendicular to the stem, and a head disposed at a distal end of the stem and forming with the stem and the surface a contiguous mass of resin. The head extends laterally from the stem to a distal edge overhanging the surface and defines an overall lateral extent at the distal edge. The fastener element has an average overhang defined as a difference between the overall lateral extent of the head and the average lateral extent of the stem. The touch fastener product is made by pressing moldable resin into respective molding cavities defined in a mold against which mold the resin surface is molded, solidifying the pressed resin in the molding cavities, and then stripping the solidified resin from the cavities as stems with associated heads disposed at distal ends of the stems and overhanging the surface, followed by deforming the heads by pressing against them with a heading surface. The deforming causes, for each of at least most adjacent pairs of fastener elements of the array, the two heads of the fastener elements of the pair to be separated by a lateral distance of between 2.0 and 7.0 times an average of the overhang of the fastener elements of the pair.

A tenth aspect of the invention features a method of making a male touch fastener product, the method including molding a resin surface while forming an array of spaced-apart male touch fastener elements extending from the surface. Each touch fastener element extends to an overall height above the resin surface and has an elongated stem extending from the surface, and a head disposed at a distal end of the stem and forming with the stem and the surface a contiguous mass of resin. The head extends laterally from the stem to a distal edge overhanging the surface about the stem. The distal edge extends toward the surface and defines a minimum edge height above the surface. The head defines a head return equal to a difference between the overall height of the fastener element above the resin surface and the minimum edge height above the surface. The touch fastener product is made by pressing moldable resin into respective molding cavities defined in a mold against which mold the resin surface is molded, solidifying the pressed resin in the molding cavities, and then stripping the solidified resin from the cavities as stems with associated heads disposed at distal ends of the stems and overhanging the surface, followed by deforming the heads by pressing against them with a heading surface. The deforming causes, for each of at least most of the fastener elements of the array, the fastener element to have an umbrella ratio, defined as a ratio of the head return to the overall height of the fastener element above the resin surface, of between about 0.2 and 0.5.

An eleventh aspect of the invention features a method of making a male touch fastener product, the method including molding a resin surface defining a machine direction along its length, while forming an array of spaced-apart male touch fastener elements extending from the surface. Each touch fastener element extends to an overall height above the resin surface and has a stem extending from the surface and a head disposed at a distal end of the stem and forming with the stem and the surface a contiguous mass of resin. The head has an upper surface with a central region that is generally flat and perpendicular to the stem and disposed directly above the stem, and an edge region surrounding the central region, in which edge region the upper surface angles downward toward the resin surface. The edge region terminates at a distal edge of the head and defines a declination angle with respect to the resin surface. The touch fastener product is made by pressing moldable resin into respective molding cavities defined in a mold against which mold the resin surface is molded, solidifying the pressed resin in the molding cavities, and then stripping the solidified resin from the cavities as stems with associated heads disposed at distal ends of the stems and overhanging the surface, followed by deforming the heads by pressing against them with a heading surface. The deforming causes, for each of at least most of the fastener elements of the array, the declination angle of the edge region of the upper surface of the head at one side of the head to be greater than at an opposite side of the head.

A twelfth aspect of the invention features a method of making a male touch fastener product, the method including molding a resin surface defining a machine direction along its length, while forming an array of spaced-apart male touch fastener elements extending from the surface. Each touch fastener element extends to an overall height above the resin surface and has a stem extending from the surface and a head disposed at a distal end of the stem and forming with the stem and the surface a contiguous mass of resin.

The head has an upper surface with a central region that is generally flat and perpendicular to the stem and disposed directly above the stem, an upper edge region surrounding the central region, in which upper edge region the upper surface is circumferentially smooth and continuous and angles downward toward the resin surface, and a lower edge region surrounding and contiguous with the upper edge region and terminating in a distal edge. The height of the distal edge above the resin surface oscillates around the head between local minima and local maxima, such that segments of the lower edge region defined between adjacent local minima form curved petals extending toward the resin surface. The touch fastener product is made by pressing moldable resin into respective molding cavities defined in a mold against which mold the resin surface is molded, solidifying the pressed resin in the molding cavities, and then stripping the solidified resin from the cavities as stems with associated heads disposed at distal ends of the stems and overhanging the surface, followed by deforming the heads by pressing against them with a heading surface. The deforming causes, for each of at least most of the fastener elements of the array, a difference between a smallest of the local minima and a greatest of the local maxima to be between about 20 and 45 percent of a difference between the overall height and the smallest of the local minima.

In developing the fastener element arrays described herein, we have identified several new structural aspects that separately and significantly contribute to the performance of the arrays as mated with female fastener products, particularly those with low-lying loops of fine denier fiber. In many cases we have described these aspects as unique relationships that, to our knowledge, have not been previously identified in this field as being of particular importance. Our description of these relationships should advance this art and enable better fastening characteristics in many applications.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is an enlarged side view of the fastener product of FIG. 2, as viewed in the cross-machine direction.

FIG. 5A is a photograph showing the fastener element of FIG. 5.

FIG. 11 is an annotated, enlarged side view of one of the fastener elements of the fastener product of FIG. 8, viewed in the cross-machine direction.

FIG. 12 is an enlarged side view of one of the fastener elements of the fastener product of FIG. 8, viewed in the cross-machine direction.

Like reference symbols in the various drawings indicate like elements.

DETAILED DESCRIPTION

Figure 1:
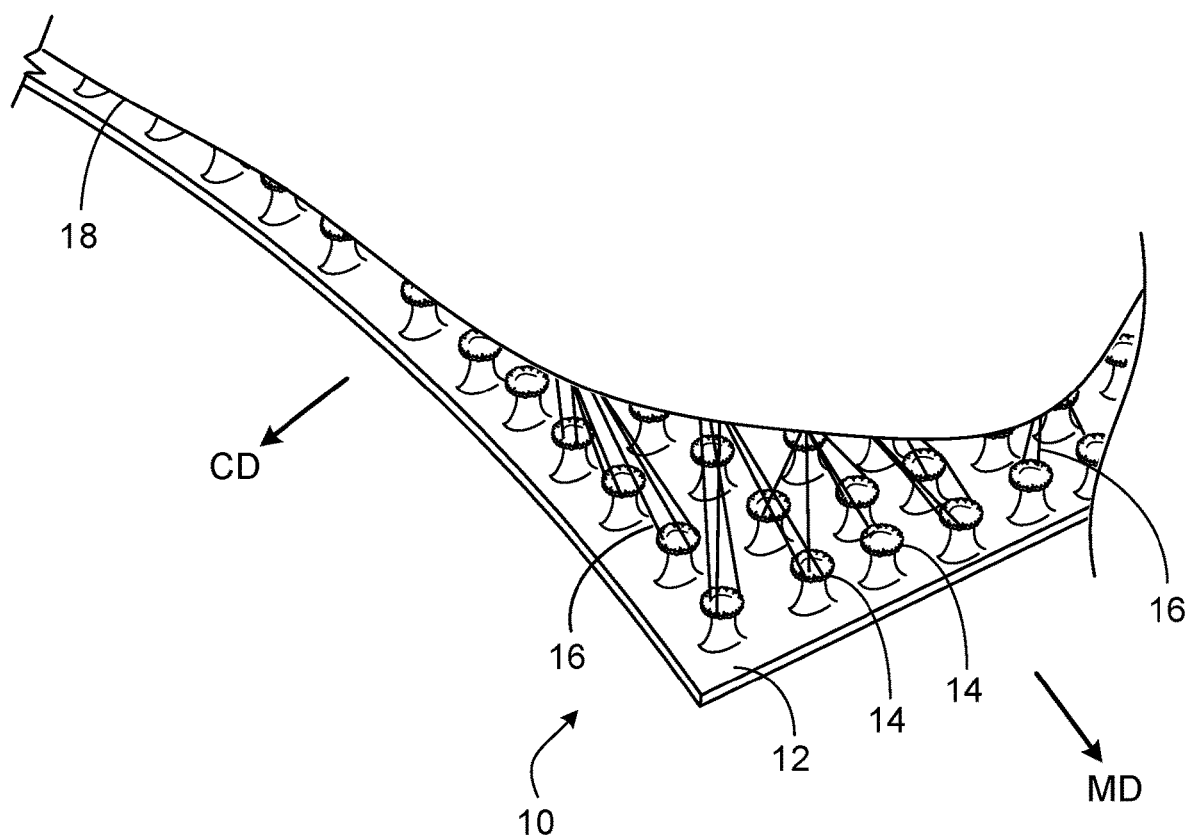
FIG. 1 is a partial perspective view of a touch fastener, in the form of a male fastener product and a mating loop fastener product, being separated.

Referring first to FIG. 1, fastener product 10 has a base sheet 12 of resin and an array of male touch fastener elements 14 extending from a broad resin side surface 15 of the base sheet. To give some proportion, base sheet 12 is about 60 μm thick and can be up to one meter or more in width, and can be manufactured in continuous length in the direction MD and rolled for transport. The fastener elements are arranged in an array on the base sheet surface, with a density of about 2700 per square centimeter, each fastener element extending only about 0.27 to 0.28 mm from the base sheet surface. The fastener elements, which are not shown to scale, are illustrated as having snagged very fine fibers 16 of a mating sheet 18 of material, such that as the two mated materials are peeled away from one another, the snagged fibers are stretched taut prior to being released. In this manner, the two materials together form a releasable fastening. The fibers the fastener elements are designed to snag and retain are extremely fine, as will be discussed in more detail below, making fastener product 10 particularly useful in snagging very low-loft knit or non-woven materials, such as those formed of extruded fibers or cotton or silk or those forming the outer covers of disposable garments such as diapers. A few different embodiments of fastener product 10 are discussed below.

Figure 2:
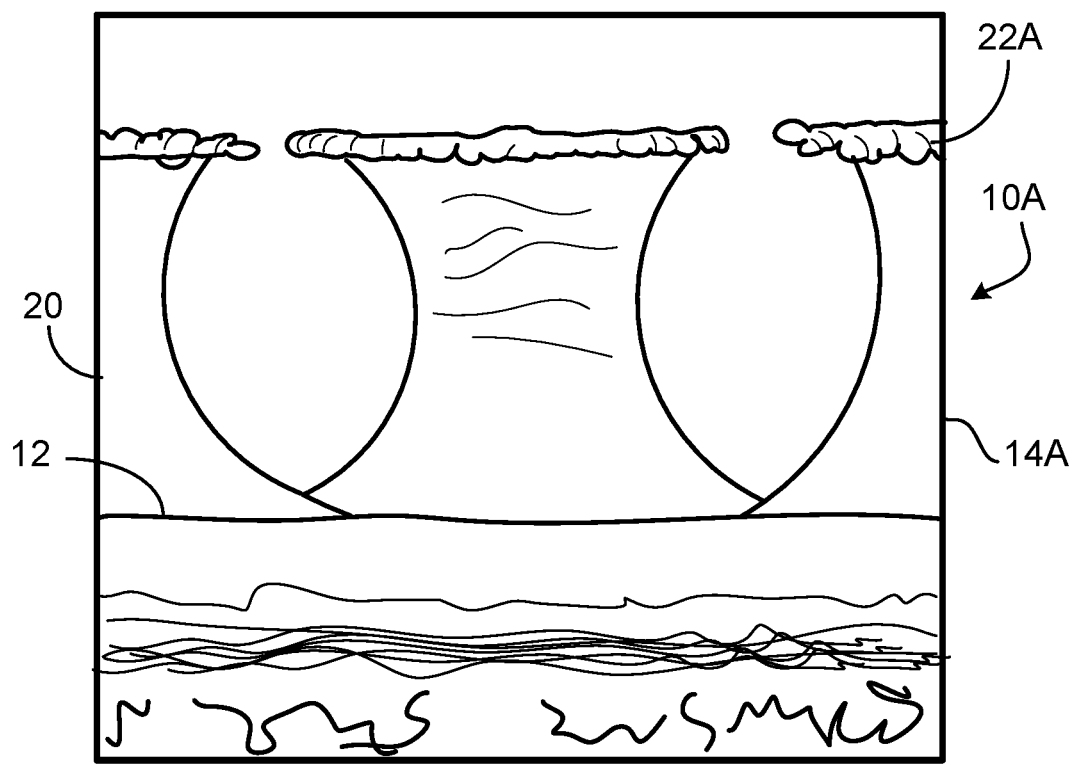
FIG. 2 is an enlarged side view of a first embodiment of the male fastener product with flat-topped fastener elements, as viewed in the machine direction.

Referring next to FIG. 2, a first embodiment of the fastener product is labeled 10A and has fastener elements 14A with generally flat tops and are formed with discrete stems 20 of resin rising integrally from a near surface of base sheet 12. The base of each stem blends into the base sheet with a generous radius approximately equal to half of the nominal stem width. Above the base the stem narrows to a waist and then widens to a head or cap 22A that extends radially or laterally outward from the stem to overhang the base sheet surface and has an overall width about twice the width of the stem. As seen in this view, looking in the machine direction MD, the fastener element profile is generally symmetrical, mirrored about a vertical line through the center of the fastener element.

As can be seen in FIG. 3, the fastener elements skew to one side when looking perpendicular to the machine direction MD. The front or leading end of each fastener element head 22A overhangs the base less than the rear or trailing end.

Figure 4:
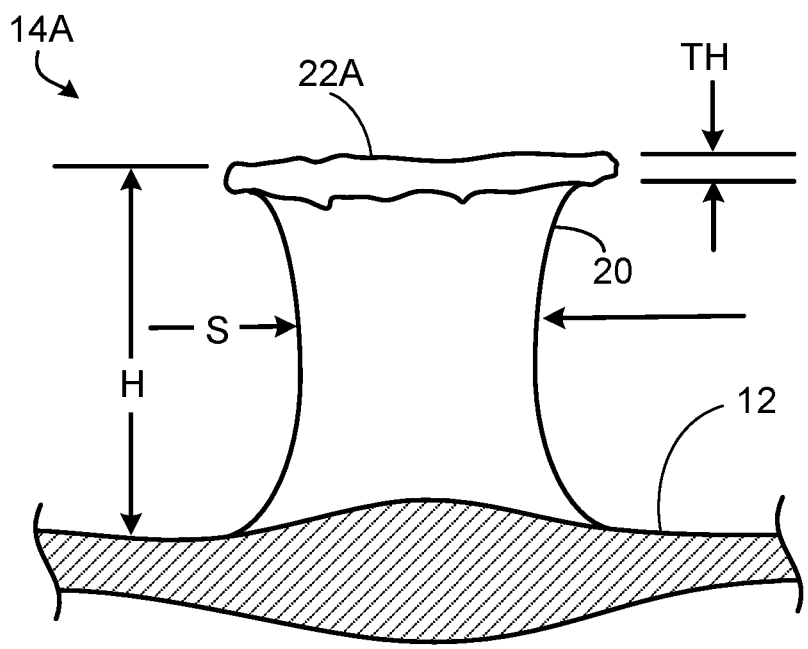
FIG. 4 is an enlarged view of one of the fastener elements seen in FIG. 2.
Figure 5:
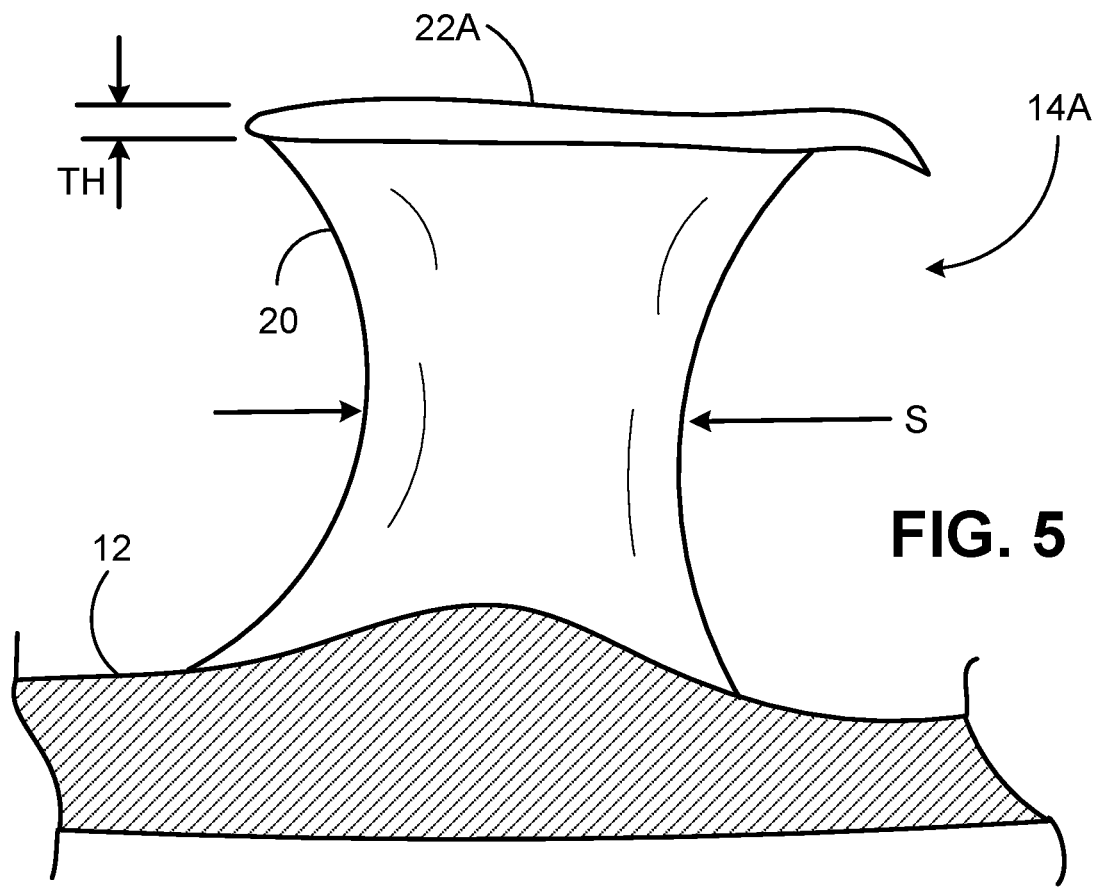
FIG. 5 is an enlarged view of one of the fastener elements seen in FIG. 3.

Referring next to FIGS. 4 and 5, the thickness TH of the head is generally constant about the fastener element, and in this case is about 50 μm or 18 percent of the overall height H of the fastener element above the base. The stem 20 has a minimum lateral extent or width S that is a little greater in the machine direction MD (FIG. 5) than the cross-machine direction CD (FIG. 4), given the cross-sectional profile of the stem, as discussed below. The bulge in apparent thickness of the base 12 at the fastener element is primarily because this section was taken immediately adjacent the stem and through part of the radius blending the stem into the base. FIG. 5A is an actual photograph of the same view as FIG. 5.

Figure 6A:
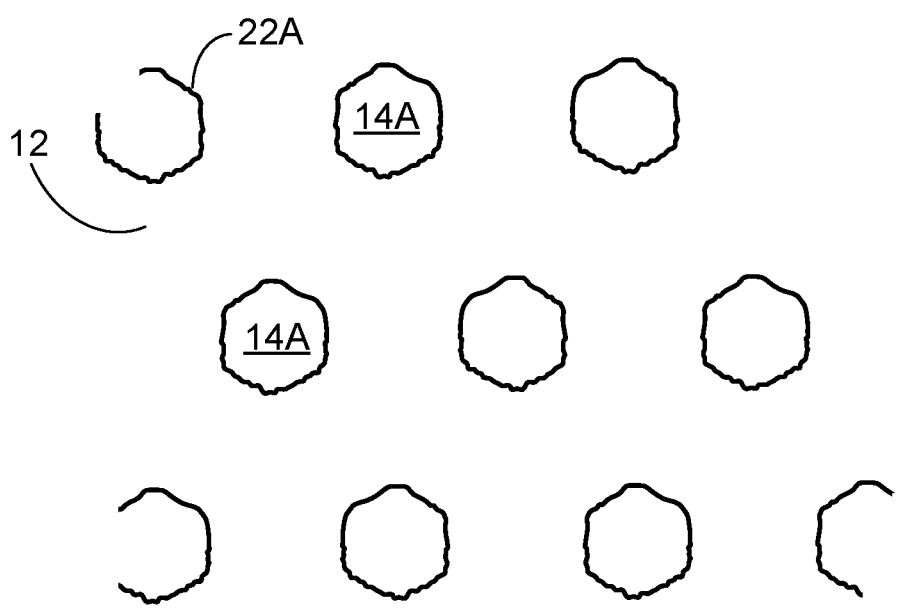
FIG. 6A is a photograph showing the top view of FIG. 6.
Figure 6:
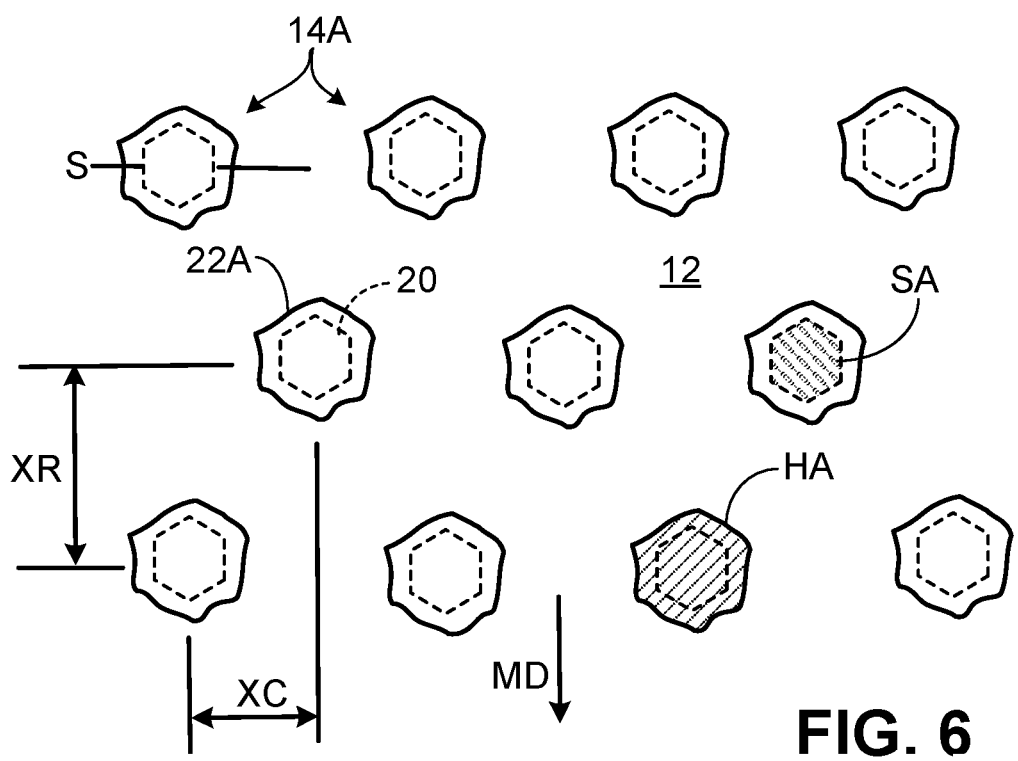
FIG. 6 is an enlarged top view of the fastener product of FIG. 2.

As shown in FIGS. 6 and 6A, the fastener elements 14A are arranged in a regular array of staggered rows and columns, with the heads 22A of adjacent fastener elements spaced apart to allow fibers to enter the volume between the base sheet and the undersides of the heads so as to be snagged. Arrow MD in FIG. 6 indicates the machine direction of the process that manufactured the fastener product. The row spacing XR between fastener elements of a given column is about twice the nominal head width, while the column spacing XC between adjacent columns is about equal to the nominal head width. In this example, XC and XR are about 318 and 550 μm, respectively.

Both the stems 20 and the heads 22A of the fastener elements 14A have generally hexagonal perimeters, with one apex of each hexagon directed in the machine direction MD. As noted above, the upper surfaces of the heads are generally flat and parallel to the base sheet. The perimeter of each head is not smooth, however, but features a series of projections extending radially or laterally outward about its perimeter. These projections or 'toes' are discussed in more detail in U.S. Pat. No. 11,246,380, the entire contents of which are incorporated herein by reference. As discussed in that patent, the width and shape of the toes vary about the perimeter of the head, and the number, size and shape of toes about the head perimeter do not correspond with any features of the cavity in which the head rim was molded. Rather, the facing sides of adjacent toes are generally curved and have been free-formed rather than formed against a mold surface. Some wider toes each appear to have multiple edge projections, while some appear to neck in width at their base. Moreover, the arrangement of toes is not precisely duplicated across each fastener element, although there are similarities in the overall distribution of toe size across fastener elements of the product.

The perimeter of the stem 20 of each fastener element, at its waist, is shown in dashed outline in FIG. 6. The projection of the area bounded by that perimeter in a plane parallel to the base we call the stem cross-sectional area or SA. The projection of the area bounded by the perimeter of the head in a plane parallel to the base we call the overall projected head area or HA. These two values determine the total overhang area of the fastener element, which is the difference between HA and SA. We have found that providing such fastener elements with an Overhang Ratio, which we define as the ratio of the overall difference of overhang area to head area across an array of at least 30 fastener elements in rows and columns, to the total area of the array, of between about 7 and 17 percent is particularly useful in the snagging and retention of fine fibers. This effect is particularly noticeable with fastener element head perimeters featuring the above-described toes.

Figure 7:
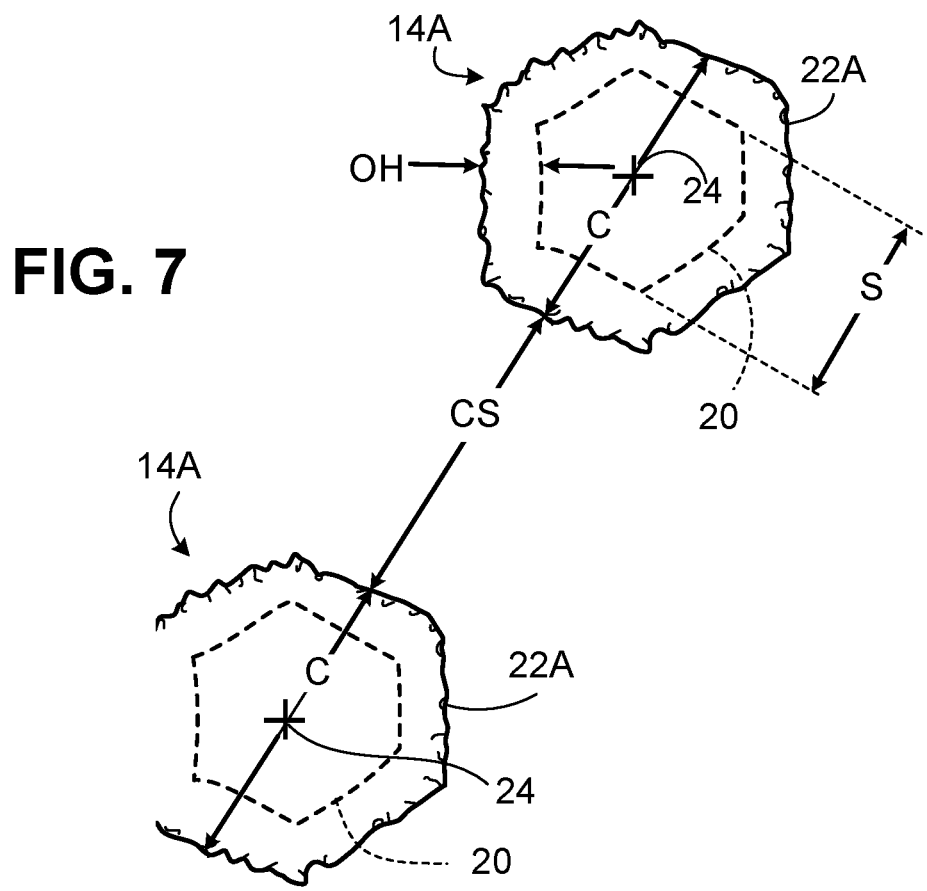
FIG. 7 is an enlarged top view showing a pair of adjacent fastener elements of the fastener product of FIG. 2.

Turning also to FIG. 7, the arrangement of fastener elements 14A in rows and columns creates significant inter-element spacing for fibers to drape between the fastener elements and be snagged by the heads. Another way to discuss this is the concept of the penetration of individual fastener elements into an often unpatterned matt of such fibers. In some applications, such fibers do not form loops that extend far from a connecting base, but rather lie near, and generally parallel to, the surface of the fibrous matt. In order for engagement to occur, the fastener element heads must enter that matt, at least far enough for the very thin edge rims of the head to slide under and snag some of the surface fibers. FIG. 7 shows an adjacent pair of fastener elements 14A, each of a different row and column in terms of the machine and cross-machine directions. The lateral extent of each head 22A, along a line connecting the centroids 24 of the stems 20, is designated C. The two heads 22A of the fastener elements of the pair are separated by a lateral distance CS, along the line connecting the centroids, of between 1.2 and 2.0 times the average of the lateral extents C of the two heads along that line. Stated another way, we find a particular utility in enhancing snagging of low-lying fibers with Spacing Capture Ratio (SCR), or the ratio CS/C, of between about 0.9 and 4.0.

Also related to the ability of the fastener element array in retaining snagged low-lying fibers is a property we call Spacing Retention Ratio (SRR), which relates the inter-head spacing to the amount of overhang under each head. Calculating this property requires determining the overhang OH of each fastener element, which is the lateral distance the head overhangs the base in any given direction. Starting from the measurements of stem width S (as the average between the two fastener elements), head lateral extent C (as the average between the two fastener elements), and distance between heads CS, all along the line connecting the centroids 24 of the stems of the pair, the Spacing Retention Ratio SRR can be calculated as CS/(C−S). We have found that providing a Spacing Retention Ratio of between about 2.0 and 7.0 provides a good retention of snagged low-lying fibers for many applications.

While the features of Spacing Capture Ratio and Spacing Retention Ratio have been discussed as between two adjacent fastener elements in different rows and columns (i.e., measured diagonally), each can also be measured with respect to a pair of adjacent fastener elements within a given row, or a pair of adjacent fastener elements within a given column.

Figure 8:
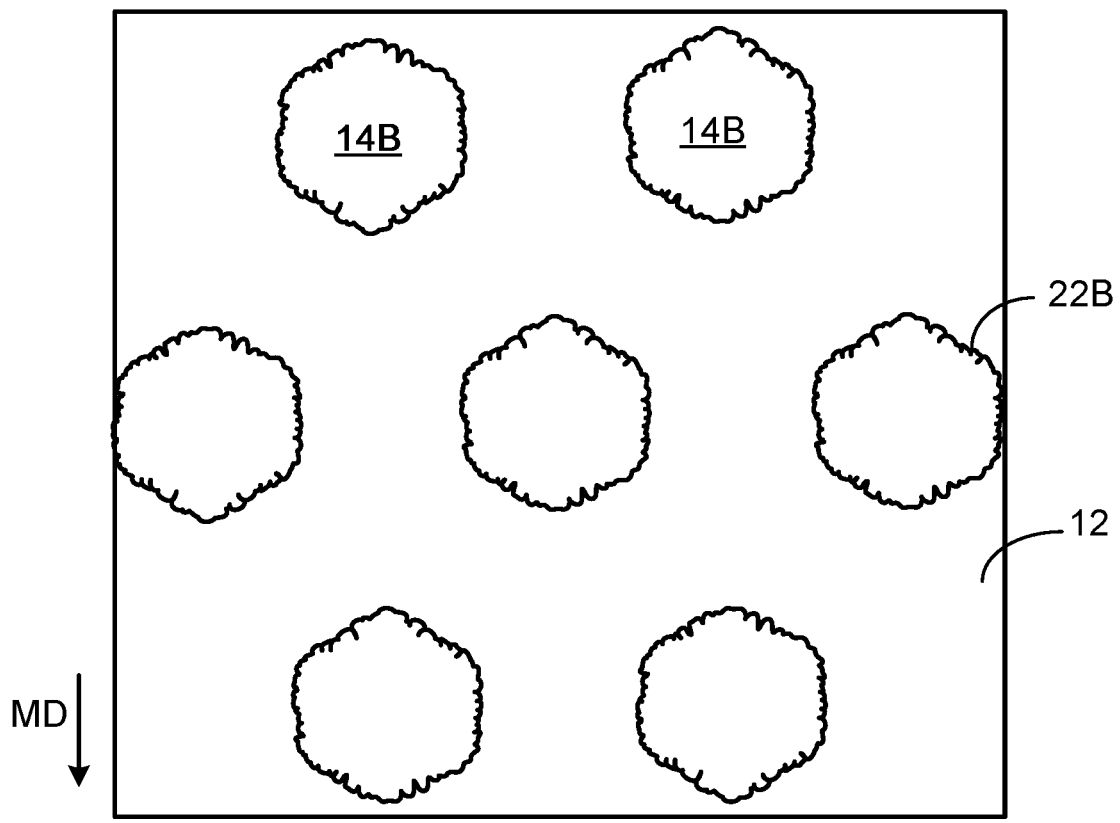
FIG. 8 is an enlarged top view of a second embodiment of the male fastener product, with umbrella-shaped fastener element heads.
Figure 9:
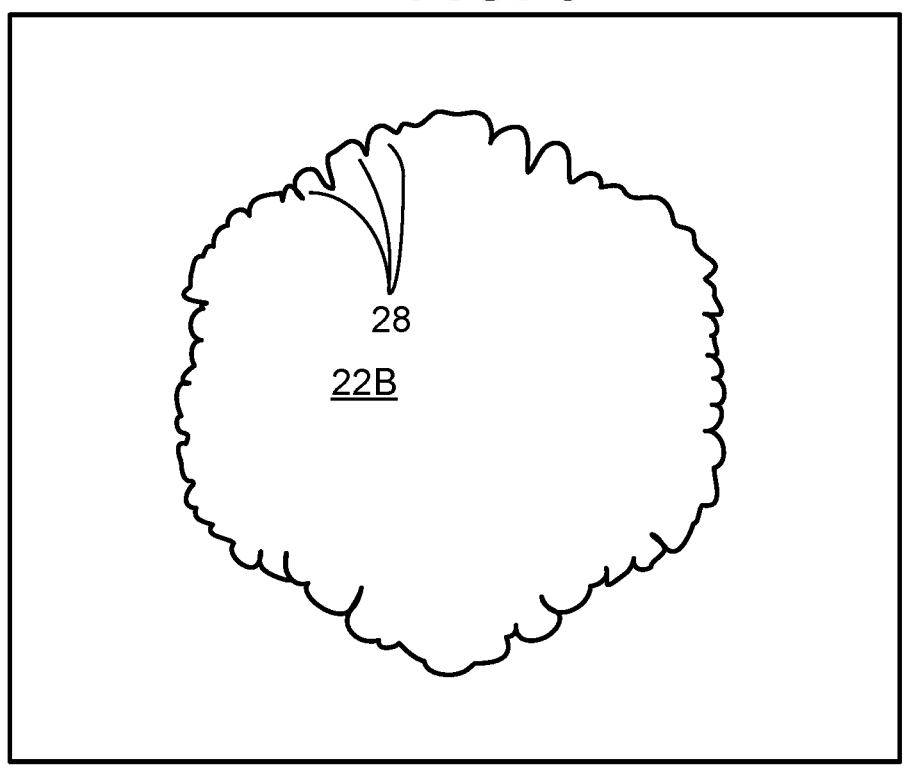
FIG. 9 is an enlarged view of one of the fastener elements of the fastener product of FIG. 8.
Figure 10:
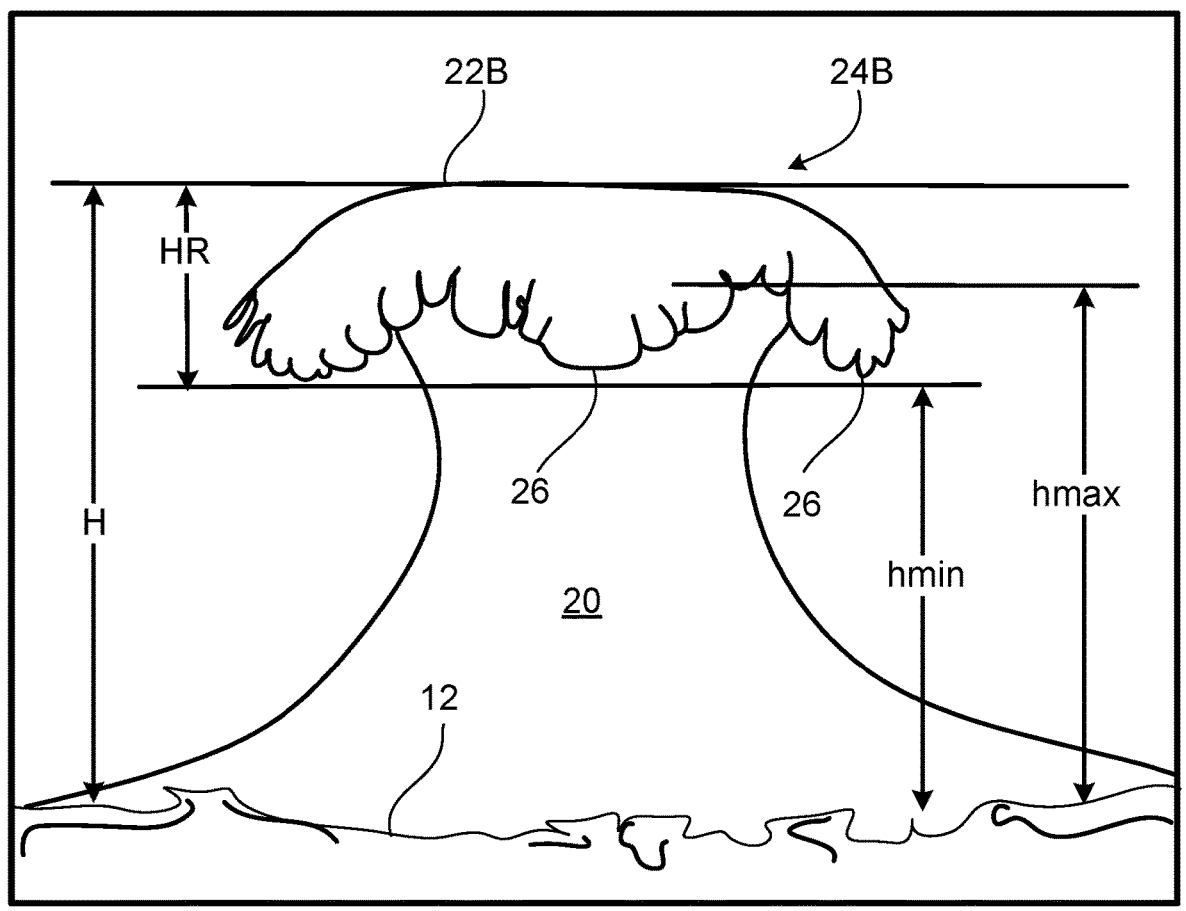
FIG. 10 is an enlarged side view of one of the fastener elements of the product of FIG. 8.

Referring next two FIGS. 8 and 9, another example of an array of fastener elements as shown in FIG. 1 has fastener elements 14B with heads that have perimeter skirts that descend toward the base 12 of the fastener product. The column and row spacing of this array is the same as the column and row spacing of the array shown in FIG. 6, and the stems of the fastener elements are the same shape and dimensions as those discussed above. In fact, the principal difference between this example and the example discussed above in FIGS. 2-7 is the structure of the fastener element heads 22B. The structure of heads 22B is best seen in FIG. 10. The area of the top of the head directly over the stem 20 is generally flat and parallel to the base 12, as in the first example, but the perimeter region of the head, the portion overhanging the base, bends down toward the base to form a series of petals, six in total, that correspond with the vertices of the hexagonally-shaped stem. In this view, taken from the machine direction MD, we are looking directly at one vertex (not readily discernible on the stem) that aligns with the petal 26 at the middle of the head. Two other petals are visible in this view, one to the left and one to the right of the central petal. The petals give the perimeter of the head a scalloped or undulating rim profile, with recesses defined between adjacent petals. These recesses are useful for catching fibers that may be sliding along the edge of the rim. This particular rim also features the toes 28 distributed about the head, with each petal having several toes separated by crevices. The toes give the edge a bumpy surface for further halting the movement of a sliding fiber or holding a retained fiber in place under fluctuating loads.

Because of the petals depending toward the base on all sides of the head, we refer to the shape of the fastener element 24B of FIG. 10 as umbrella-shaped. One of the characteristics of an umbrella-shaped fastener element is that the head 22B occupies a greater vertical space than the non-umbrella-shaped fastener elements of FIGS. 2 and 3, for example. In this case, head 22B has a head return (HR) of about 100 µm, for example, on a fastener element with an overall height H of 260 µm. Preferably the head occupies a vertical distance (HR) between 20 and 50 percent of the overall fastener element height H. It can also be seen in this view that the height of the head rim or distal edge varies greatly about its perimeter, with at least some of the inter-petal recesses (e.g., the one just to the right of the stem in this view) extending upward to at least half the overall head return HR. This distal edge has a height above the surface of base 12 that oscillates around the head between local minima and local maxima, such that segments of the lower edge region defined between adjacent local minima form curved petals 26 extending toward the resin surface. Preferably, the difference between the smallest of the local minima 'hmin' and a greatest of the local maxima 'hmax' is between about 20 and 45 percent of a difference between the overall height 'H' and the smallest of the local minima 'hmin' (which is also the head return HR). The significant head return, and the significant variation in head rim height around the fastener element, are both believed to contribute to an increase in fastening performance, particularly in peel resistance. Significantly more force is required to flip up the edge of the fastener element head to dislodge a snagged fiber, and there is more resistance to a fiber tending to slide along the rim edge under load. Furthermore, the ragged edge of the rim is far enough below the top of the fastener element array that it does not detract from the smooth feel of the array against skim.

Referring also to FIG. 11, the heading of the stems against a compliant roll (as will be discussed further below) causes a difference in skirt angle between the leading and trailing sides of the head. We define skirt angle as the angle of inclination of the upper surface of the head, in side profile, as determined by a best-fit line along the head surface. In the illustration of FIG. 11, the forward or leading skirt angle is $\alpha F$ and the rear or trailing skirt angle is $\alpha R$. The heading is performed with the product moving from left to right along machine direction MD. The horizontal reference for skirt angle is a line parallel to base 12. In this example, $\alpha F$ is about 43 degrees and $\alpha R$ is about 31 degrees. The skirt angles on either side of the head, looking in the machine direction (FIG. 12), are more or less equal and equal to $\alpha F$.

In other words, the processing of the head results in a steeper leading skirt angle as compared to the skirt angles in other directions about the head. The front and rear skirt angles also determine the included head angle, αZ, which mathematically is the difference between 180 degrees and the sum of αF and αR. In other words, αZ=180−(αF+αR). The included head angle can be considered the apex of a non-symmetric cone defining the frusto-conical surface formed by the skirt of the fastener element, which must penetrate the field of fibers. Because of the differences in front and rear skirt angles, the apex is displaced forward relative to the center of the stem. This asymmetry can cause a desired difference in fastening properties, both as to engagement and retention of low-lying fibers, that is also dependent on the direction of any lateral motion of the fastener element as it enters, or while it resides in, the field of fibers. Depending on the desired properties, a fastening product can be cut from the continuous strip and secured to an underlying surface in any desired orientation.

Figure 13:
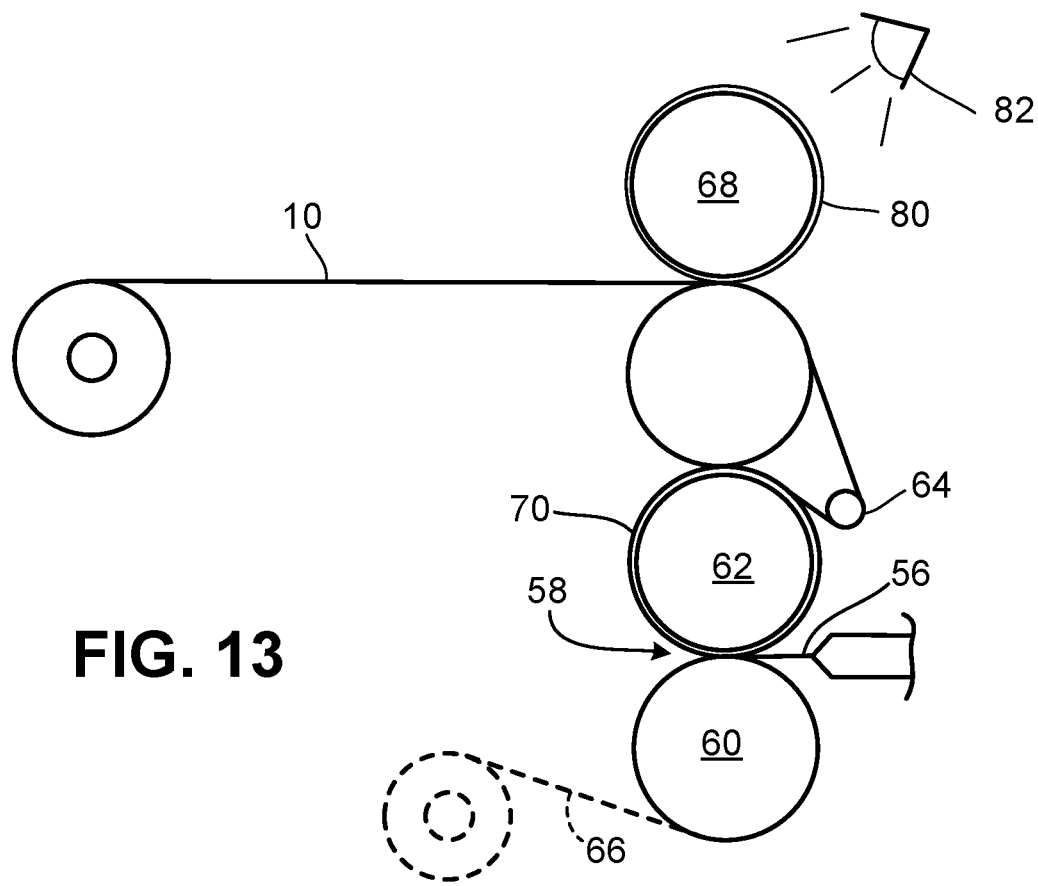
FIG. 13 schematically illustrates a method and apparatus for forming an array of fastener elements with a continuous base sheet.

Referring next to FIG. 13, resin fastener products such as shown in FIG. 1 (with any of the fastener element arrays described above) can be made in a continuous roll-molding process in which molten resin 56 is introduced into a nip 58 between two counter-rotating rolls including a pressure roll 60 and a mold roll 62 that defines cavities in the shape of the above fastener elements. Pressure in nip 58 forces the resin into the cavities, where it solidifies as contiguous resin solidifies on the surface of the roll before being stripped off of the mold roll by being passed around a stripper roll 64 and then spooled for storage. In some cases a preformed web 66 is introduced to the nip with the resin, such that while some of the resin is filling the cavities to form the fastener elements, resin forming the base sheet is laminated directly to the web surface, such as by the resin intermingling with surface features of the web, partially penetrating the web surfaces in the case of a fibrous web. The spooled product in that case comprises the web with the base sheet of resin on one side of the web, and the array of fastener elements extending from the base sheet. The resin can be introduced to the nip in discontinuous volumes to form the base sheet in separate islands or patches or width-wise continuous lanes, each bearing fastener elements. The resin can also be introduced in multiple, spaced apart lanes across the width of the web, to form a fastener product with continuous, longitudinal lanes of fastener elements separated by lanes of exposed web surface.

The male touch fastener products shown in the above figures were molded from PPC7650 polypropylene, available from TOTAL. This resin has a melt flow index at 230 degrees C. and 2.16 kg of 15 grams in 10 min, and has a flexural modulus of 1400 MPa. The tape was continuously processed as shown in FIG. 13 at a continuous line speed, resulting in a tape with an overall weight of 100 grams per square meter and an overall thickness, including the base and fastener elements, of 0.23 millimeter.

After molding and being stripped from the cavities, the still warm tape is passed through a further nip against a heated heading roll 68 to deform the upper end of the stem into the desired head shape. To form the flat-topped fastener element head shapes shown in FIGS. 2-7, roll 68 is provided with a hard steel roll surface that plastically deforms the heads to increase their flatness. Preferably, the heat and pressure applied by roll 68 is sufficient to flatten the upper head surface without melting away any desired toe structures formed about its periphery. The effect of the flattening can be seen, for example, in FIG. 2, from which it can be seen that the outer rim area of the upper surface of each fastener element, containing the toes, lies in a plane generally perpendicular to the stem. In some cases, the central portion of the upper surface forms a shallow depression.

Figure 14:
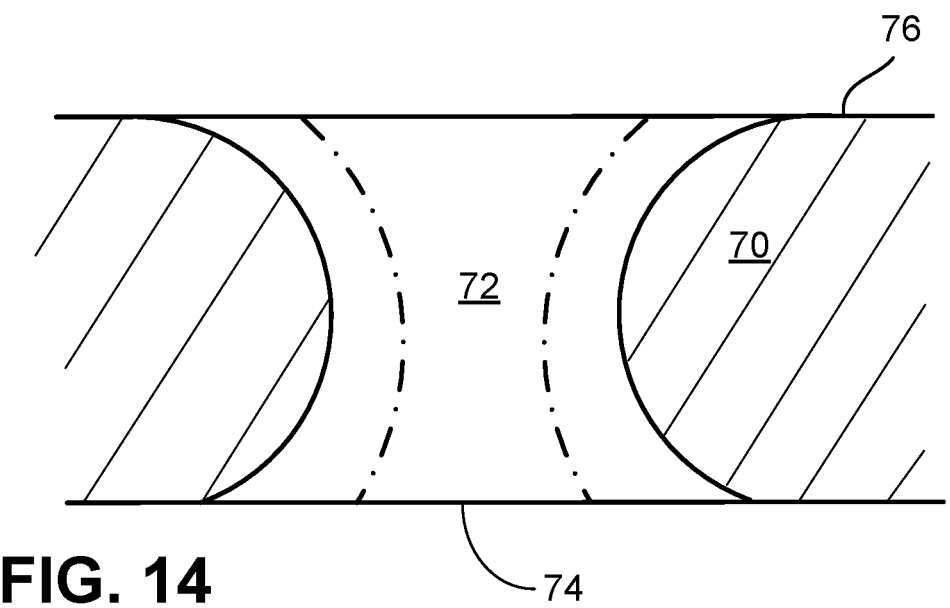
FIG. 14 shows a cross-section of an individual cavity in which a fastener element or fastener element preform is molded.
Figure 15:
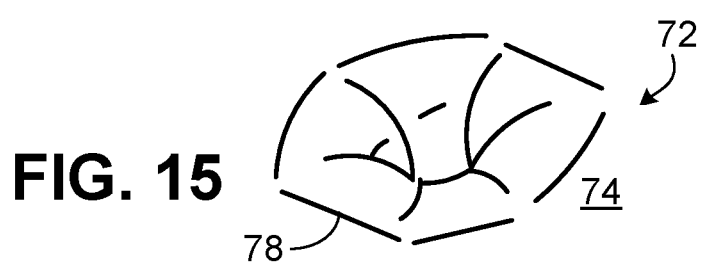
FIG. 15 is a perspective view of the end of the cavity, as viewed from the inner surface of the screen.

Referring also to FIGS. 14 and 15, cavities 72 shaped to form suitable fastener element preforms can be defined in a sleeve 70 fit tightly to an outer surface of a cylindrical core of mold roll 62, with the cavities extending all of the way through the sleeve such that the distal ends of the preforms are formed on the outer core surface at the inside surface 74 of the sleeve. Methods of laser cutting using a pulsed fiber laser, tilting the beam axis as it travels about the cavity perimeter, are capable of forming cavities of this shape and size in stainless steel, in some cases followed by a light etch. Screens with such cavities can also be made by electroforming techniques.

Pressure in nip 58 fills cavities 72 with resin and forms an interconnecting layer of resin at the outer surface 76 of the sleeve that becomes the base of the fastener product. The flare formed at the opening of the cavity 72 at the inner surface 74 of the sleeve has a generally hexagonal perimeter 78 where it blends into the inner sleeve surface (see FIG. 15) and forms the flared distal end of the molded preform, including any toes about the perimeter. In other words, any toes are formed within this smooth and continuous rim cavity that tapers to a sharp edge at the surface of the inner roll core, and the inter-toe surfaces and bounded crevices are not themselves determined or formed by specific mold surfaces or features. In each of the six segments of the hexagonal flare the cavity surface is generously radiused between the portion forming the narrowest part of the stem and the core surface, which essentially forms a tangent to the arc of the cavity surface. As the resin is pressed at high rate into this ever-narrowing rim portion of the cavity, the toes form. As can be seen from the curved outer toe surfaces in the images discussed above, the resin flow eventually freezes and forms non-molded surfaces at the distal toe ends. The central part of the cavity 72 has a hexagonal cross-section and forms the molded stem.

For forming the umbrella-shaped fastener element heads shown in FIGS. 8-12, roll 68 is provided with a rubber coating 80, such as of silicone, elastomeric rubber, urethane, EPDM, natural rubbers, SBR, Nitrile Rubber, Viton, flouroelastomers, neoprene, Butyl Rubber or high performing synthetic rubber (XNBR/HNBR), of 5-20 mm in thickness and a durometer of about 60 Shore A. In the forming of the illustrated fastener elements, a rubber coating thickness of 12 mm was employed. A non-contact temperature sensor 82 continuously monitors the actual surface temperature of the coating 80, and the heating of roll 68 is controlled to maintain a temperature appropriate to cause the desired deformations, depending on line speed and materials used.

Figure 16:
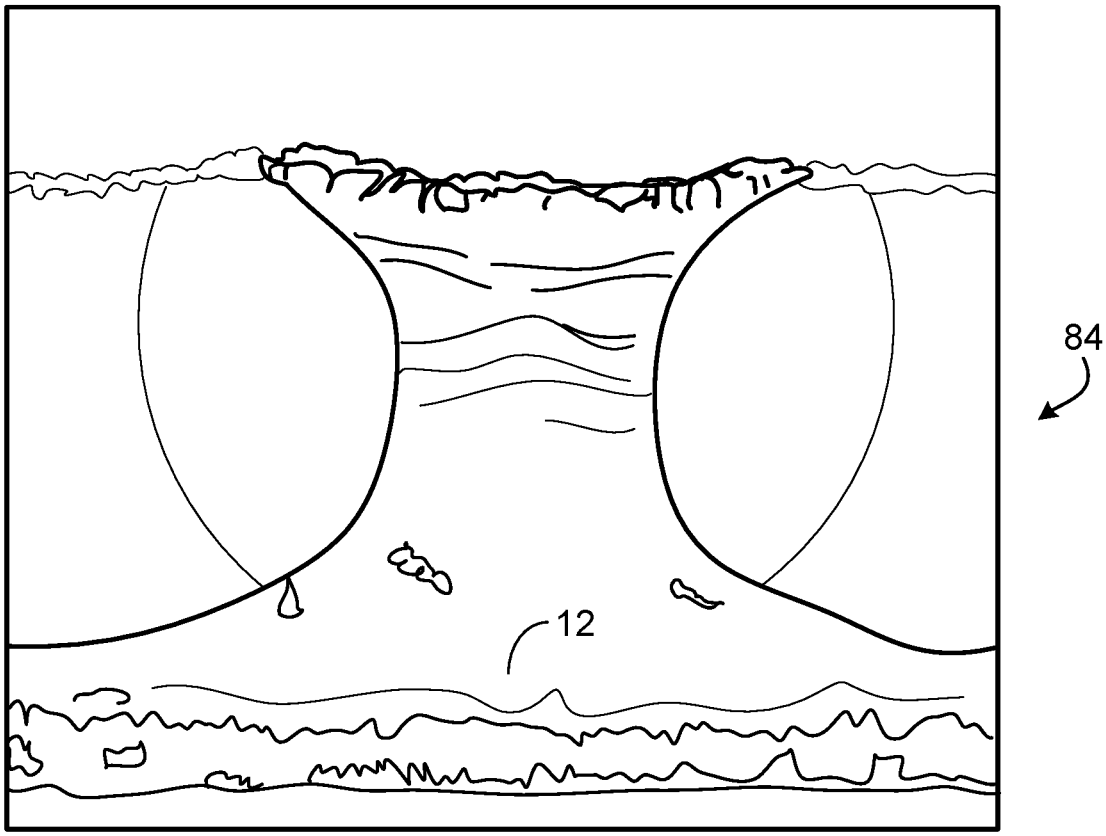
FIG. 16 is an enlarged side view of a preform fastener product, before reshaping of the heads.

The fastener element preforms, after extraction from their cavities and before engaging roll 68, have distal ends with perimeters directed upward due to the stresses imparted to the warm resin during demolding. An example of how such fastener element preforms appear is shown in FIG. 16. We refer to these preforms 84 as flower-shaped, as the rims already exhibit some petal segmenting due to the cavity shape and the slight variation in demolding forces about the periphery of the rim, and the rim is disposed significantly above the central portion of the top of the preform. Treatment with the rubber-coated roll plastically deforms these preforms into the umbrella-shaped fastener elements 24B shown in FIG. 12.

Figure 17:
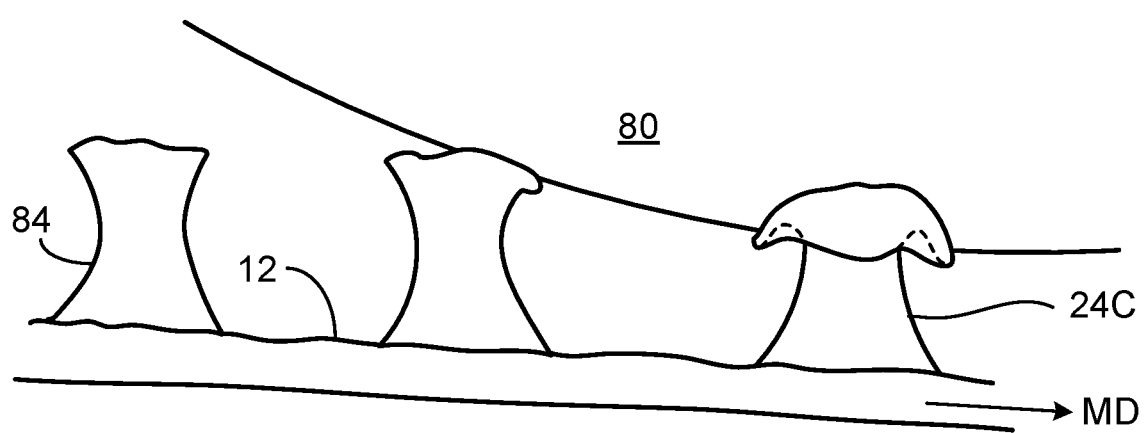
FIG. 17 is an enlarged side view of the product of FIG. 16, following deforming the heads against a compliant roll surface.

The process of forming umbrella-shaped fastener elements or cup-shaped heads is shown schematically in FIG. 17. As the distal ends of the preforms 84 contact the compliant coating 80 on the heated roll, the resin of the preforms elastically deforms the coating while the coating plastically deforms the preforms. The roll is driven to match the line speed of the fastener product as it moves in the machine direction MD from left to right. The curvature of the heading roll is exaggerated here for illustration. Generally, the heading roll may have a diameter on the order of 25 cm while the finished fastener elements may have a height of only about 260 μm. It is believed that in the middle of the nip the mushroom heads of the fastener elements are at least mostly submerged into the undeflected volume of the coating. As noted above, in the region directly above the stem the resulting upper surface of the fastener element is generally flat, while the perimeter of the head is pressed downward to form the scalloped skirt discussed above.

Further processing may be employed, as desired for a given application. For example, flexible products may be molded as continuous sheets with the fastener elements as described above, and then plastically stretched within their plane after molding to reduce the thickness of sheet and decrease the density of the fastener elements. Stretching may be done laterally to improve the tear resistance of the sheet along the longitudinal direction, or biaxially. The product may be stretched laterally to increase its area by up to a factor of seven, for example.

Figure 18:
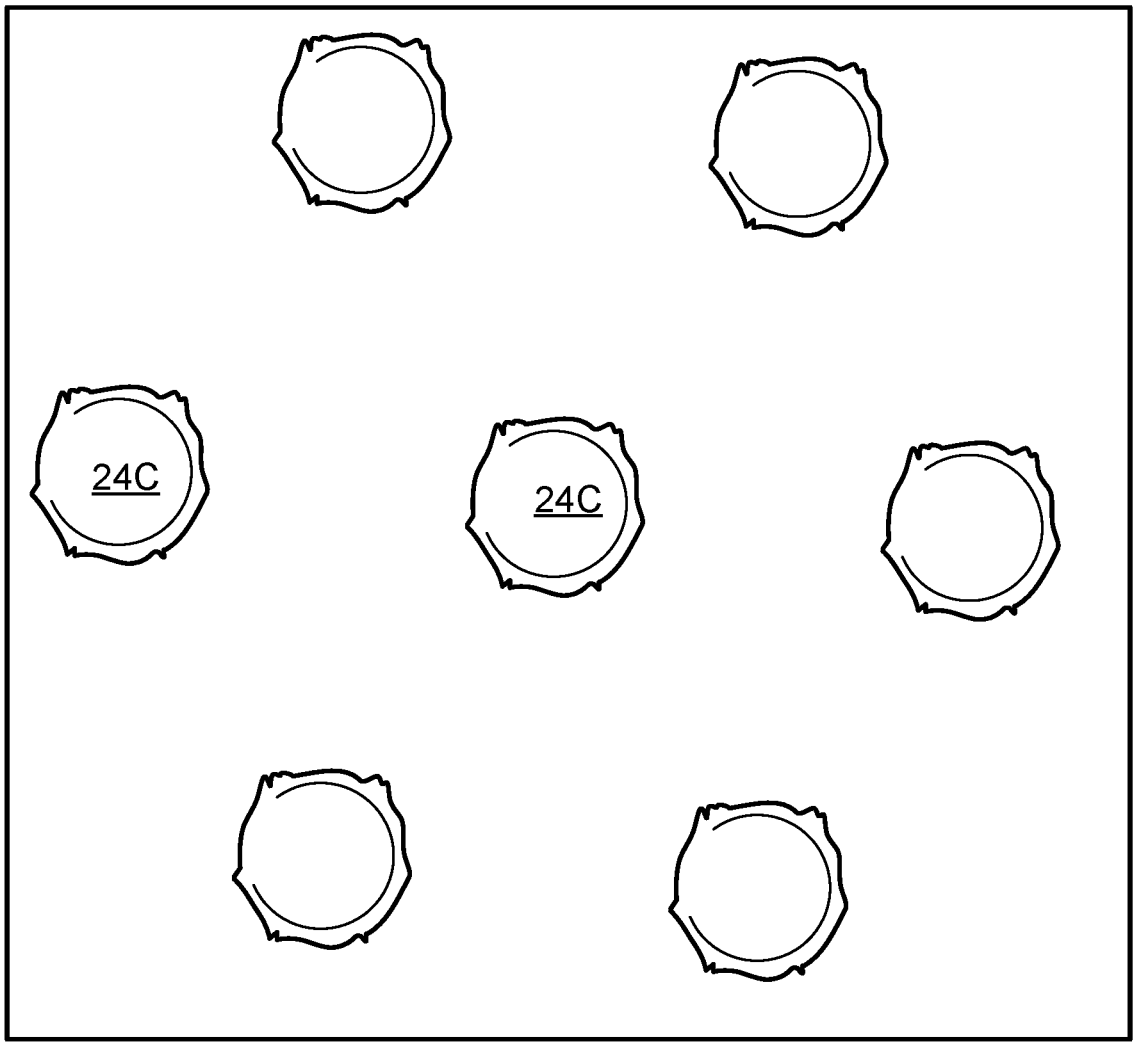
FIG. 18 schematically illustrates the process of deforming a fastener element preform against a compliant roll surface.
Figure 19:
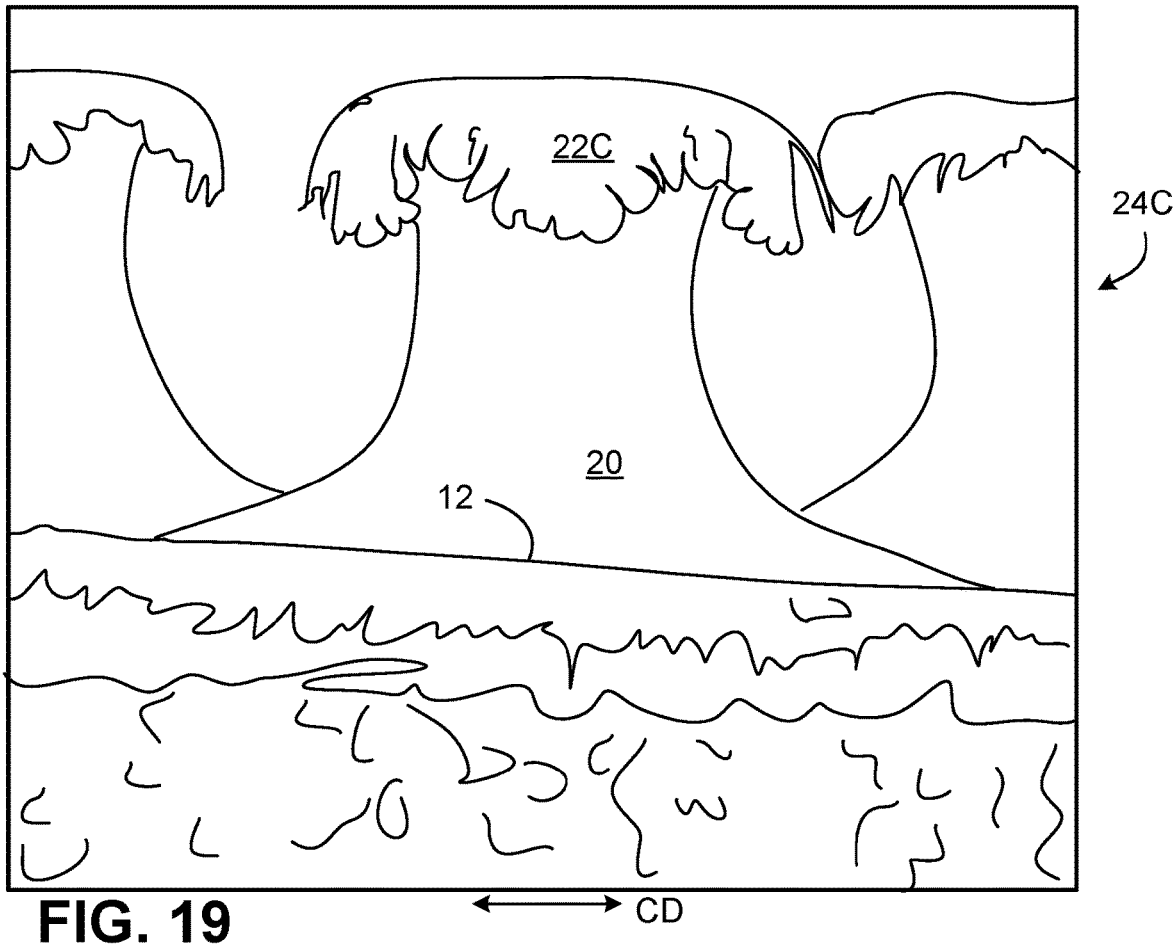
FIG. 19 is an enlarged side view of a fastener element of a third embodiment of the male fastener product, with umbrella-shaped fastener element heads.
Figure 20:
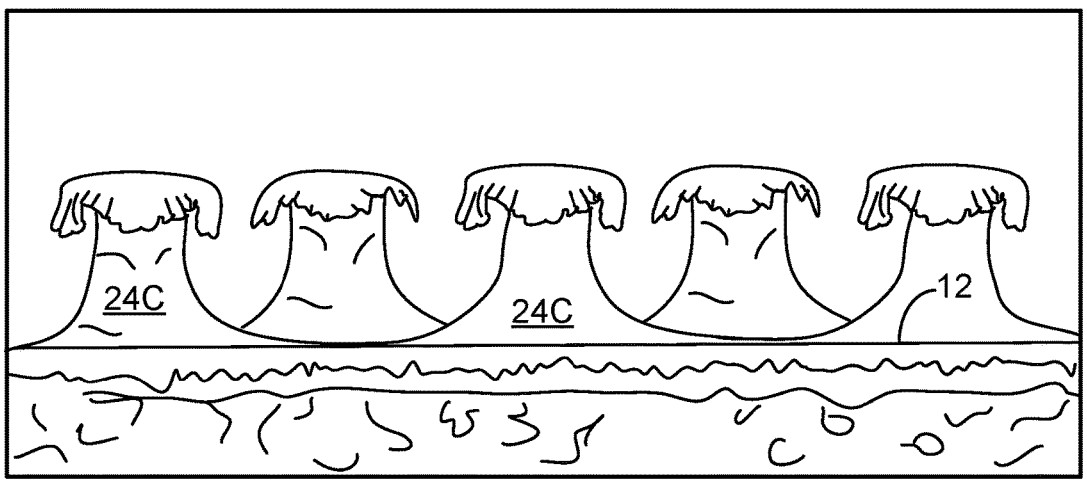
FIG. 20 is a side view of the third embodiment of the male fastener product, viewed in the machine direction.

FIGS. 18-20 show another example fastener element 24C, molded and processed as fastener element 24B but deformed against a conforming roll surface of lower durometer, such that pressure against the compliant roll causes the edge about the head to fall more steeply toward the base 12. The central region of the upper surface of the head, directly over stem 20, remains generally flat. Because of the more substantial deformation of the edge of the head, more pronounced folds may be formed between adjacent petals, which may aid in snagging fibers. At least many such folds will feature one or more inter-toe crevices at or near the apex of the fold, as seen in the figures.

While a number of examples have been described for illustration purposes, the foregoing description is not intended to limit the scope of the invention, which is defined by the scope of the appended claims. There are and will be other examples and modifications within the scope of the following claims.

The invention claimed is:

1. A method of making a male touch fastener product, the method comprising
    pressing moldable resin into respective molding cavities defined in a mold, thereby forming a resin layer on a surface of the mold while forming an array of spaced-apart resin projections extending from the resin layer;
    stripping the formed resin layer from the surface of the mold, thereby pulling solidified resin from the cavities; and then
    deforming distal ends of the projections by pressing the formed projections against a compliant outer surface of a heated roll, thereby forming from resin of each projection a fastener element comprising a stem extending from the resin layer to a head overhanging the resin layer.

2. The method of claim 1, wherein the compliant outer surface of the heated roll comprises a coating of the heated roll.

3. The method of claim 2, wherein the coating is of a material selected from the group consisting of silicone, elastomeric rubber, urethane, EPDM, natural rubber, SBR, Nitrile Rubber, fluoroelastomers, neoprene and Butyl Rubber.

4. The method of claim 2, wherein the coating has a thickness of between 5 and 20 millimeters.

5. The method of claim 2, wherein the coating has a durometer of about 60 Shore A.

6. The method of claim 1, further comprising monitoring a temperature of the compliant outer surface, and controlling heating of the heated roll to maintain a desired surface temperature.

7. The method of claim 1, wherein the projections comprise fastener element preforms having distal ends with rims directed away from the resin layer, with the rims having peripheries disposed farther from the resin layer than central portions of top surfaces of the preforms.

8. The method of claim 7, wherein deforming the distal ends of the projections deforms the fastener element preforms into umbrella-shaped fastener elements.

9. The method of claim 1, wherein deforming the distal ends comprises elastically deforming the compliant outer surface of the heated roll while plastically deforming the distal ends.

10. The method of claim 1, wherein the projections each comprise a stem extending from the resin layer, and a head disposed on a distal end of the stem, the head overhanging the resin layer.

11. The method of claim 10, wherein deforming the distal ends comprises at least mostly submerging the heads of the projections into an undeflected volume of the heated roll.

12. The method of claim 10, wherein each head has a distal edge comprising multiple toes extending laterally outward and varying in shape and size about the edge, with adjacent toes having facing, free-form resin surfaces defining crevices therebetween, the crevices being narrower than the adjacent toes.

13. The method of claim 1, wherein deforming the distal ends comprises forming flat surfaces directly above stems of the projections.

14. The method of claim 1, wherein the projections are of polygonal cross-section.

15. The method of claim 1, wherein the formed resin layer comprises a solid resin surface from which the projections extend.

16. The method of claim 1, wherein the mold comprises a mold roll, the surface of the mold roll comprising a peripheral surface of the mold roll.

17. The method of claim 1, wherein the surface of the mold is a surface of a mold screen defining the molding cavities.

* * * * *